United States Patent [19]

Fromm

[11] Patent Number: 4,771,440
[45] Date of Patent: Sep. 13, 1988

[54] DATA MODULATION INTERFACE

[75] Inventor: Eric C. Fromm, Eau Claire, Wis.

[73] Assignee: Cray Research, Inc., Minneapolis, Minn.

[21] Appl. No.: 937,374

[22] Filed: Dec. 3, 1986

[51] Int. Cl.$^4$ .................. H04L 27/10; H04L 27/18
[52] U.S. Cl. ........................ 375/52; 375/22; 332/16 R
[58] Field of Search .............. 375/22, 49, 52, 62, 375/64; 360/44; 332/16 R, 9 R

[56] References Cited

U.S. PATENT DOCUMENTS

| | | | |
|---|---|---|---|
| 3,454,718 | 7/1968 | Perrzault | 375/49 |
| 3,665,103 | 5/1972 | Watkins | 375/49 |
| 3,683,277 | 8/1972 | Kuller et al. | 375/49 |
| 3,921,009 | 11/1975 | Comas et al. | 329/106 |
| 4,066,841 | 1/1978 | Young | 375/49 |
| 4,207,524 | 6/1980 | Purchase | 375/22 |
| 4,264,880 | 4/1981 | Kawashima et al. | 332/9 R |
| 4,309,673 | 1/1982 | Norberg et al. | 332/16 R |
| 4,428,007 | 1/1984 | Tanaka et al. | 375/22 |
| 4,497,060 | 1/1985 | Yang | 375/22 |
| 4,499,585 | 2/1985 | Mosley et al. | 375/62 |

OTHER PUBLICATIONS

IBM Technical Disclosure Bulletin–Davis, vol. 27, No. 4B, Sep. 1984, pp. 2531–2533.
IBM Technical Disclosure–Beirne, vol. 20, No. 10, Mar. 1978, pp. 4124–4127.
IBM Technical Disclosure Bulletin–Rosen et al., vol. 16, No. 8, Jan. 1974, pp. 2744–2745.
IBM Technical Disclosure Bulletin–Kulikowski and Pierlott, vol. 16, No. 6, Nov. 1973, pp. 1944–1945.
IBM Technical Disclosure Bulletin–Hahs, vol. 14, No. 1, Jun. 1971, pp. 116–117.

Primary Examiner—Robert L. Griffin
Assistant Examiner—Stephen Chin
Attorney, Agent, or Firm—Merchant, Gould, Smith, Edell, Welter & Schmidt

[57] ABSTRACT

A data modulation interface is provided for serial data transmission. A biphase signal is encoded with the binary bits of a parallel data word. The bits of the parallel data word are examined to determine whether there are more one bits or zero bits in the word. A polarity bit is provided in addition to the other bits to indicate which bit-state occurred most often. The biphase signal is modulated to create different time intervals between phase reversals with one time interval corresponding to a bit-state of one and another time interval corresponding to a bit-state of zero. The shortest time interval is assigned to correspond to the bit-state occurring most often in the word so that the total time required to transmit each word is minimized. A time interval can be assigned to a sync signal transmitted after each parallel data word. A time interval can also be assigned to correspond to plural bit combinations so they can be represented by a single phase interval and transmitted quickly.

8 Claims, 6 Drawing Sheets

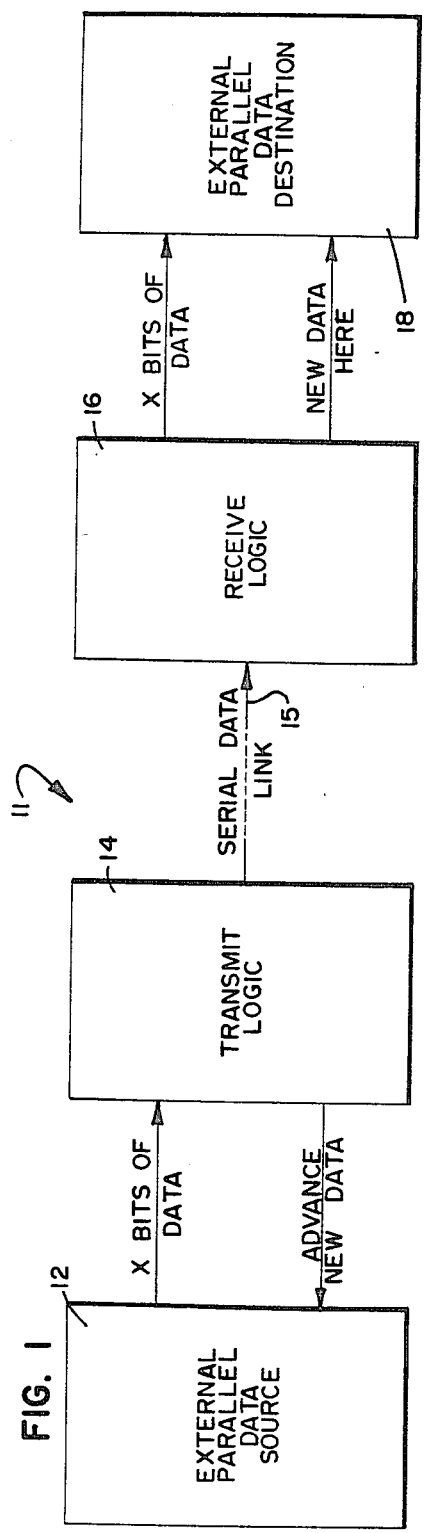
FIG. 1
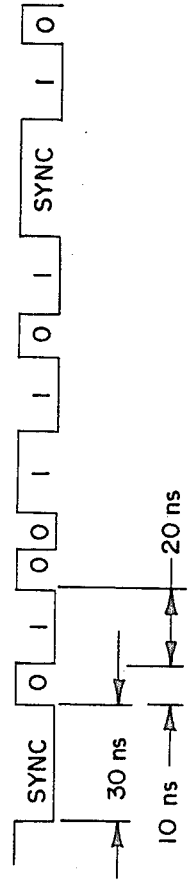
FIG. 2 TYPICAL WAVEFORM:

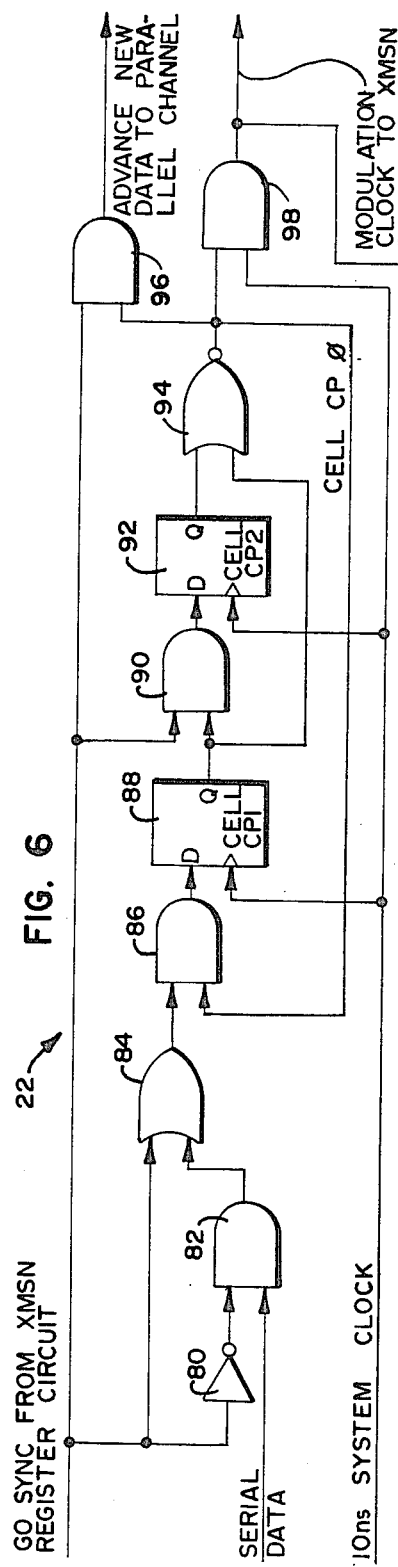
FIG. 6
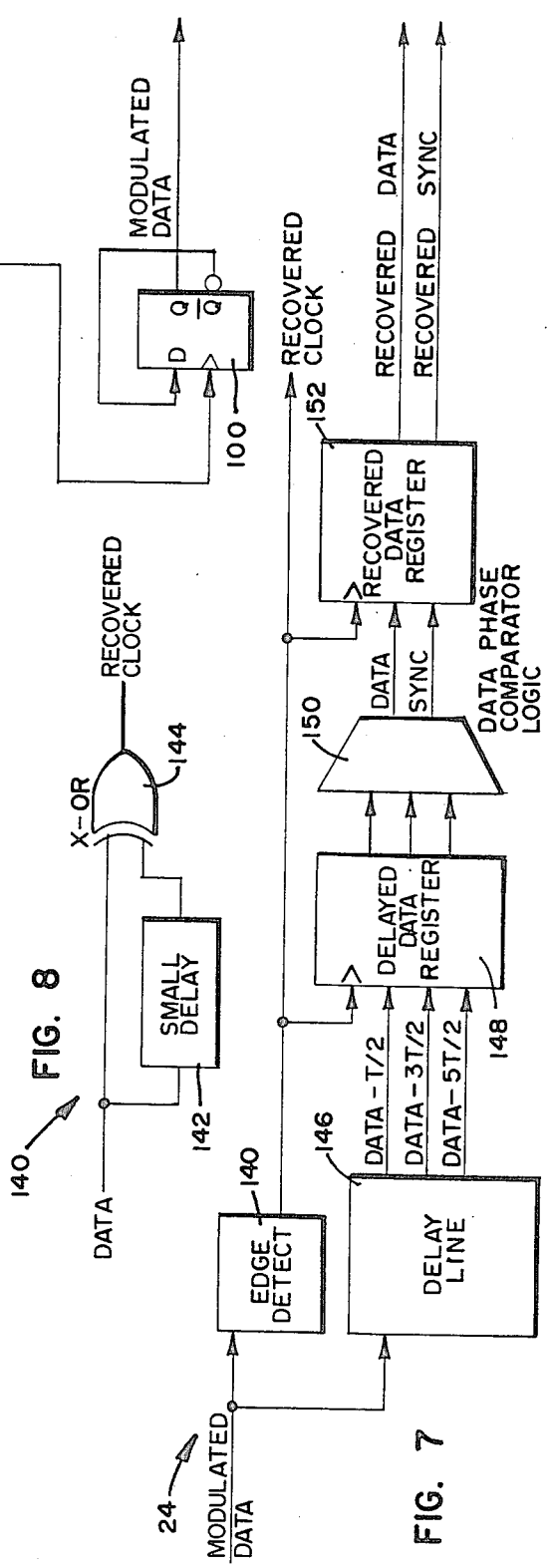
FIG. 8
FIG. 7

DATA MODULATION INTERFACE

TECHNICAL FIELD OF THE INVENTION

The present invention pertains generally to the field of data transmission and more particularly to the art of serial biphase data transmission.

BACKGROUND OF THE INVENTION

Serial data transmission is employed in a wide variety of computer-communication applications such as in the industry standard RS-232 communications interface and in modem telecommunications. Various serial data transmission encoding systems have been devised. In a typical system the binary data in the form of logic "1" and logic "0" signals are encoded on the transmission medium by the presence or absence of a voltage or a pulse. These logic signals are transmitted in streams and include clock or synchronizing signals for use by the data receiver in controlling the various logic operations required to extract the encoded binary data from the stream.

In other encoding systems, the binary data, rather than being transmitted in the form of the presence or absence of a pulse, is represented by the relative widths of the data pulses. Such a system is disclosed in U.S. Pat. No. 4,066,841 to Young. In Young, the binary data are encoded into a serial biphase data stream and the time intervals between phase transitions in the biphase stream are used to represent logic "1" and logic "0" states of the encoded binary data. Thus, the system of Young allows for relatively high bandwidth because successive encoded binary data in the stream do not need to be separated by a non-code carrying time segment.

SUMMARY OF THE INVENTION

The present invention provides a method and apparatus for serial data transmission incorporating the basic biphase encoding method disclosed in the Young patent. According to one aspect of the present invention, the binary bits of a parallel data word to be transmitted are examined to determine whether there are more one bits or more zero bits in the word. A polarity bit, which is a bit in addition to the bits of the parallel data word, is provided to indicate which bit-state occurred most often. A biphase signal is modulated to create two different time intervals between its phase reversal, with one time interval corresponding to a bit-state of one and the other time interval corresponding to a bit-state of zero. The shortest of the two time intervals is assigned to correspond to the bit-state that occurred the most in the word and the longest time interval is assigned to correspond to the bit-state that occurred the least in the word. Accordingly, the total time required to transmit each word is minimized.

According to another aspect of the invention, a sync signal is transmitted after each parallel data word. This eliminates the "hunt" mode that interfaces such as the RS-232 interface use to determine their location in a bit stream.

According to another aspect of the invention, the time intervals of the biphase signal are defined in terms of a minimum interval T and an interval increment i. For a system employing n distinct time intervals, the intervals would be: T, T+i, T+2i, T+(n−2)i, T+(n−1)i. For the embodiment described above, the intervals of T and T+i would correspond to bit-states of 0 and 1, with T corresponding to the bit-state that occurs most often, and the time interval T+2i would correspond to the sync signal.

Another aspect of the invention provides for more than two different intervals to correspond to bit-states so that plural bit combinations can be be represented by a single phase interval.

Another aspect of the invention provides for unique interval increments $I_j$ for $j=0,1,\ldots n-1$ generated for each progressively larger interval duration.

Another aspect of the invention provides for a transmission register for receiving the binary bits of a parallel data word and for shifting out the data word one bit at a time. The implementation of the transmission register eliminates the requirement of a separate counter circuit to determine when the transmission register has been exhausted of data, which results in a savings in associated control logic circuitry. Means are provided at the transmission register for determining whether there are more one bits or more zero bits in each data word. The transmission register appends a polarity bit to each data word to indicate which bit-state occurred most often. Modulation means are provided for modulating a biphase signal to create different time intervals between its phase reversal with the shortest time interval corresponding to the bit-state that occurred most often and another time interval corresponding to the bit-state that occurred least often.

Yet another aspect of the invention provides for demodulation means for receiving a serial biphase data stream and recovering the data bits encoded thereon. The demodulation means includes means for examining the polarity bit to determine which bit-state corresponds to which time interval. Recovered data assembly register means are provided for assembling the bits of the data word and shifting them out in parallel. The implementation of the recovered data assembly register eliminates the requirement of a separate counter circuit to determine when the recovered data assembly register is full of data, which results in a savings in associated control logic circuitry.

BRIEF DESCRIPTION OF THE DRAWINGS

FIG. 1 is a general block diagram of the data modulation interface according to the present invention;

FIG. 2 is a waveform diagram according to the present invention;

FIG. 6 is a detailed schematic of the modulator circuit according to the present invention;

FIG. 7 is a block diagram of the demodulator according to the present invention;

FIG. 8 is a block diagram of the edge detector according to the present invention.

DETAILED DESCRIPTION OF THE INVENTION

Figure 3:
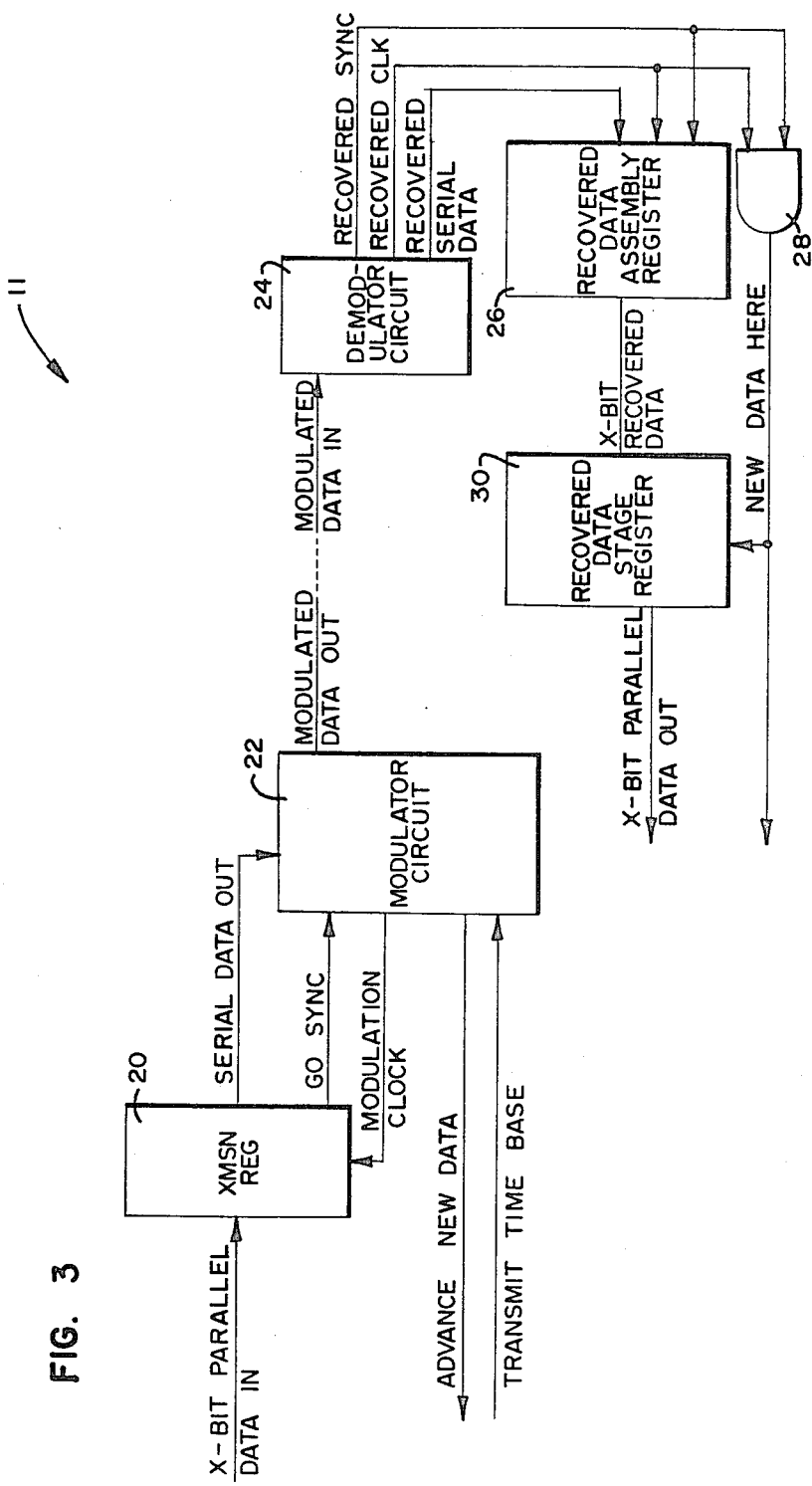
FIG. 3 is a more detailed block diagram of the data modulation interface according to the present invention.

FIG. 1 shows the general block diagram of a digital data interface 11 according to the present invention. An x-bit parallel data word is generated by external parallel data source 12. The data word is converted to a serial bit stream and modulated by transmit logic 14 onto a serial data link 15. When transmit logic 14 has transmitted a complete word, it signals external parallel data source 12 to advance a new x-bit parallel data word. Serial data link 15 may consist of, for instance, a copper wire, fiber optic strand or telemetry. The modulated serial data is received by receive logic 16 which demodulates the data and reassembles the serial data into an x-bit parallel data word. When an x-bit parallel data word is completely reassembled, receive logic 16 signals the data destination 18 and the word is conveyed over.

The present invention utilizes a biphase signal modulation format in which the interval duration between phase reversals is modulated, with each unique, or distinct, interval duration representing an assigned binary code, for instance a "one" or "zero" bit or bit-state or a special encoding signal. Where n=the number of distinct intervals provided, digital data interface 11 functions with n≧2. In the preferred embodiment of the present invention, the distinct intervals are defined in terms of a minimum interval T, and an interval increment i. For a system employing n distinct interval durations, those intervals are thus defined as: T, T+i, T+2i ... T+(n-2)i, T+(n-1)i.

In the embodiment of the invention herein disclosed, there are provided three distinct intervals, i.e., n=3, and T=10ns and i=10ns. This produces interval durations of T, T+i, and T+2i, or 10ns, 20ns and 30ns, respectively. A waveform using this tertiary embodiment is shown in FIG. 2. In this waveform, the 30ns interval duration has been assigned to represent a sync signal, the 20ns interval duration has been assigned to the bit-state of "1", and the 10 ns interval duration has been assigned to the bit-state of "0".

An alternative embodiment of the present invention provides for unique interval increments, $I_j$ for j=0, 1, ... n−1, generated for each progressively larger interval duration.

FIG. 3 shows a more detailed block diagram of digital data interface 11 in which logic 14 of FIG. 1 is shown broken down in a transmission register 20 and modulator circuit 22; and in which receive logic 16 is broken down into a demodulator circuit 24, recovered data assembly register 26 and a recovered data stage register 30. An x-bit parallel data word is loaded into transmission register 20, which outputs the x bits of the x-bit parallel data word one-by-one to modulater circuit 22. At the beginning of each modulation cycle, transmission register 20 sends a sync signal to modulator circuit 22 causing it to generate the predetermined sync signal interval. Modulator circuit 22 signals transmission register 20 to transfer individual bits with a modulation clock signal. This modulation clock ensures that the x-bit parallel data word is advanced through transmission register 20 in lock-step with transmission of serial modulated data from modulator circuit 22. Modulator circuit 22 itself uses a system transmit time base clock, which as indicated in the illustration of FIG. 2 is 10ns. Modulator circuit 22 signals the external parallel data source 12 (shown in FIG. 1) to advance new data to transmission register 20 when modulator circuit 22 is done encoding a complete x-bit data word.

Demodulator circuit 24 recovers the sync signal, clock signal and serial data from the modulated serial data. The modulator circuit 24 outputs the recovered sync signal, clock signal, and serial data to recovered data assembly register 26 where the x bits of the x-bit data word are stored temporarily. The reassembled data word is then output to recovered data stage register 30. The recovered sync signal and the recovered clock signal are gated through AND gate 28 the output of which is used to load the recovered data into recovered data stage register 30 and to signal the external parallel data destination 18 that new data is ready. Recovered data stage register 30 outputs an x-bit parallel data word to external parallel data destination 18 (shown in FIG. 1).

Figure 4:
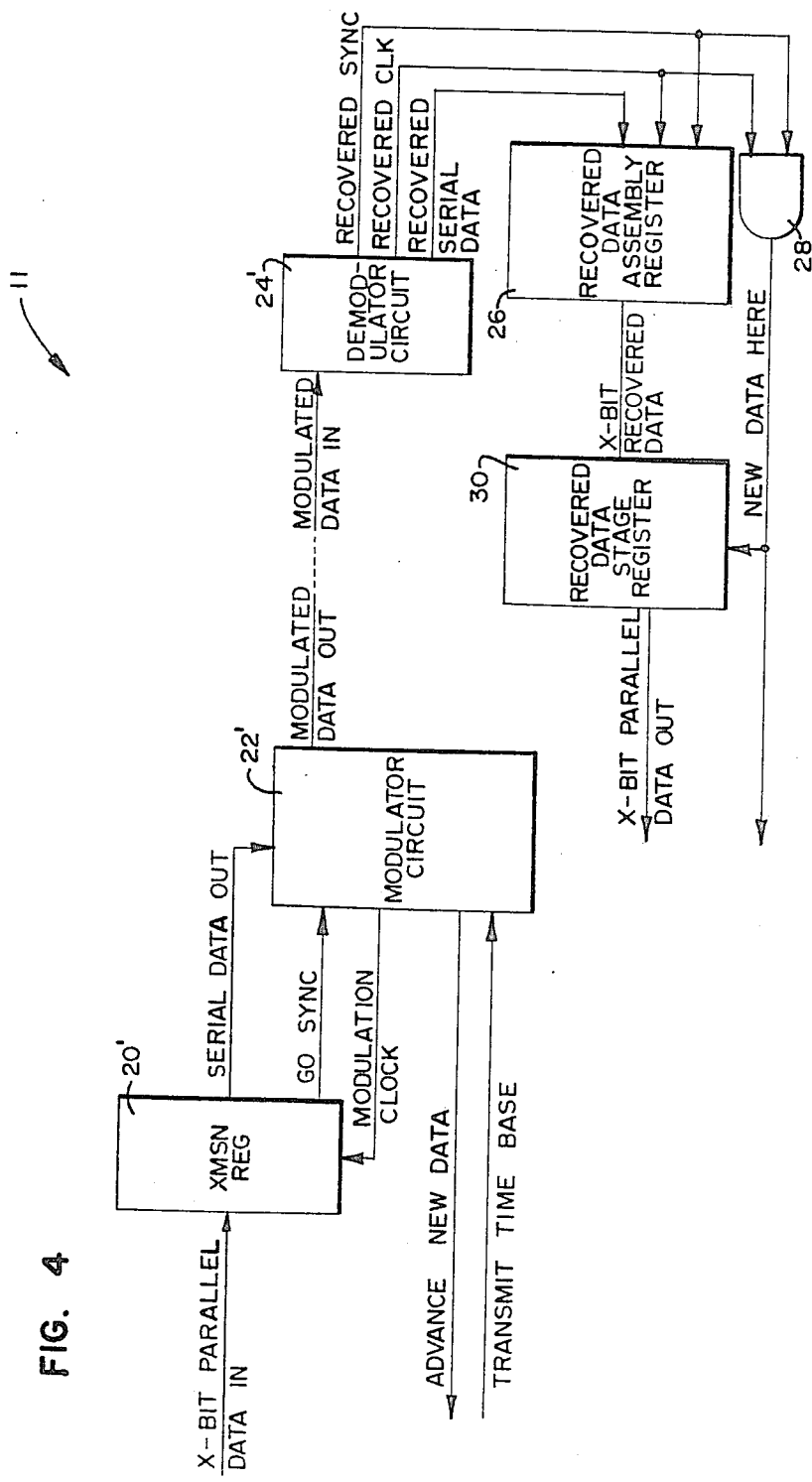
FIG. 4 is a detailed block diagram of an alternative embodiment of the data modulation interface according to the present invention.

An alternative embodiment of the data modulation interface is shown in FIG. 4. When an x-bit parallel data word is loaded into transmission register 20', the data word is examined by circuitry in transmission register 20' to determine whether there are more "1" bits or more "0" bits in that x-bit data word. If there are more "0" bits, a polarity bit, which is a bit in addition to the x bits of the data word, is set to "0" and vice versa. The polarity bit is sent to modulator circuit 22' to indicate whether the data bits coming from transmission register 20' should be inverted or not before modulator circuit 22' modulates the biphase signal to represent the x bits of the data word. In the preferred embodiment where the modulator circuit 22' is designed to assign the shortest time interval to a "0" data bit, the data bits are not inverted when the polarity bit is a "0" and they are inverted when the polarity bit is a "1". For example, if the x-bit data word loaded into transmission register 20' is 00010001, the polarity bit would be a "0" because there are more "0" bits than "1" bits in the data word. The "0" polarity bit indicates to modulator circuit 22' that the bits of the data word should not be inverted. Thus, the x-bit data word is modulated with the shortest time interval assigned to the most often occurring "0" bit and overall transmission time is minimized. If, however, the x-bit data word is 11101110, the polarity bit would be a "1". The "1" polarity bit indicates to modulator circuit 22' that the bits of the data word should be inverted. After inversion, the data word is 00010001 and the overall transmission time is again minimized because the x-bit data word is modulated with the shortest time interval assigned to the most often occurring "0" bit in the inverted data word.

The polarity bit, when it is received by demodulator circuit 24', indicates whether the data bits have been inverted or not. If the polarity bit is a "0", demodulator circuit 24' does not invert the recovered data bits before transmitting the bits to recovered data assembly register 26. If the polarity bit is a "1", demodulator circuit 24' re-inverts the recovered data bits before transmitting the bits to recovered data assembly register 26. Thus, the original x-bit data word loaded into transmission register 20' is recovered. In the above example, the 00010001 original data word is not inverted by demodulator circuit 24' because the polarity bit is a "0". The 11101110 original data word which was inverted and transmitted as 00010001 by modulator circuit 22' is re-inverted to 11101110 by demodulator circuit 24' because the polarity bit is a "1".

Figure 5:
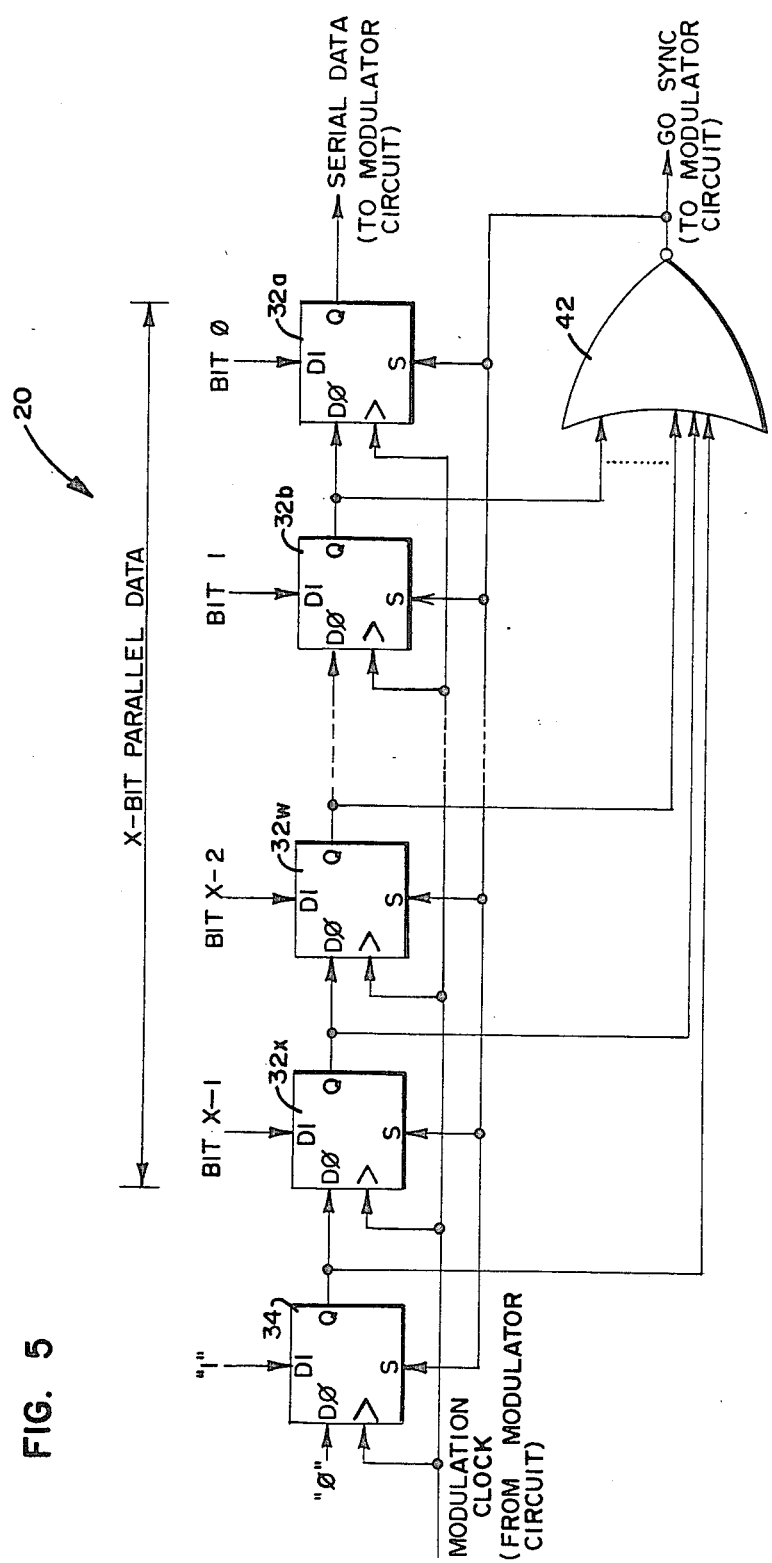
FIG. 5 is a detailed schematic of the transmission register according to the present invention.

FIG. 5 shows a detailed schematic of transmission register 20. Transmission register 20 has x+1, 2 x 1 multiplexer flip-flops, 32a 32x and 34 where x = the number of bits in the parallel data word. Each of these flip-flops have two inputs, D0 and D1, one output, Q, and a data select, S, which determines which input of the flip-flop is output from the flip-flop on the next clock signal. The x+1 flip-flops are arranged in a series such that Q output of one flip-flop is tied to D0 input of the adjacent flip-flop. Serial data is output from flip-flop 32a and sent to modulator circuit 22. The outputs Q of flip-flops 32b -32x and 34 are also fed to NOR gate 42. The output of NOR gate 42 is tied to the S input on each of the x+1 flip-flops.

Operation of transmission register 20 begins when S is set (S="1") which causes each flip-flop to accept input from the D1 input. An x-bit parallel data word is then loaded into flip-flops 32a -32x, with bit 0 of the parallel data word loaded into flip-flop 32a, bit 1 loaded into flip-flop 32b, an so on with bit x-1 loaded into flip-flop 32x. The flip-flops are clocked with the modulation clock signal which is sent by modulator circuit 22 when it is ready for the next bit of data or sync signal. On the modulation clock signal after D1 has been selected, each flip-flop outputs D1 to the D0 input of the flip-flop to its right. Flip-flop 34 outputs its D1 input, always a "1", to the D0 input of flip-flop 32x. Flip-flop 32x outputs its D1 input, bit x −1 of the x-bit parallel data word, to the D0 input of flip-flop 32w, and so on. Flip-flop 32a outputs its D1 input, bit 0 of the x-bit parallel data word, to modulator circuit 22 on the modulation clock signal.

On the next modulation clock signal, S is reset to "0" so each flip-flop will output its D0 input. Thus, flip-flop 34 outputs its D0 input, always a "0", to the D0 input of flip-flop 32x. Flip-flop 32x outputs its D0 input, always a "1" at this stage of the data shifting, to the D0 input of flip-flop 32w, and so on. Flip-flop 32a outputs its D0 input, bit 1 of the x-bit parallel data word, to modulator circuit 22 on this modulation clock signal.

It can be seen from the preceding description that the x-bit data word will be output one bit at a time from transmission register 20 to modulator circuit 22, with bit 0 being output first, bit 1 output second, and so on with bit x−1 being output last. When the Q output of each multiplexer 32b -32x and 34 is a "0", NOR gate 42 will output a sync signal, a "1". When bit x −1 has been output from transmission register 20, the output of flip-flop 32b is a "1", which has been shifted down from flip-flop 34. On the next modulation clock signal, the Q output of flip-flop 32b turns to "0" so that NOR gate 42 outputs a sync signal which is sent to modulator circuit 22. The sync signals also sets S on each of the flip-flops so that the flip-flops load another parallel data word.

FIG. 6 shows a detailed schematic of modulator circuit 22. The sync signal from transmission register 20 is input to inverter 80. The output of inverter 80 along with the serial data from transmission register 20 is input to AND gate 82. The output of AND gate 82 and the sync signal from transmission register 20 is input to OR gate 84. The output of OR gate 84 along with the output of NOR gate 94 are input to AND gate 86. The output of AND gate 86 is tied to the D input of D flip-flop 88. The Q output of flip-flop 88 is input along with the sync signal from transmission register 20 to AND gate 90. The output of AND gate 90 is input to the D input of D flip-flop 92. The Q output of flip-flop 92 is input along with the Q output of flip-flop 88 to NOR gate 94. The output of NOR gate 94 is input along with the sync signal from transmission register 20 to AND gate 96. The output of AND gate 96 is the advance new data signal and is sent to external parallel data source 12 shown in FIG. 1. The output of NOR gate 94 is also input along with a 10 ns systems clock to AND gate 98. The output of AND gate 98 is the modulation clock which is sent to transmission register 20 to clock the flip-flops in that circuit. The 10 ns systems clock is also used to clock flip-flop 88 and flip-flop 92. The output of AND gate 98, the modulation clock, is used to clock D flip-flop 100. Flip-flop 100 has its inverted output Q tied to its input D. The Q output of flip-flop 100 is the modulated data signal.

Modulator circuit 22 modulates a biphase signal such that the interval duration between phase reversal corresponds to a "0" bit-state, a "1" bit-state, or a sync signal. In the embodiment herein disclosed, these interval durations are 1, 2 or 3 system clock periods. With a system clock period of 10ns, the interval durations between phase reversals for the "0", "1" and sync signals would be 10ns, 20ns and 30ns, respectively. The 20ns and 30ns interval durations are produced by masking one or two system clock pulses respectively.

Referring to FIG. 6, it can be seen that when the output of AND gate 98 is a "1", flip-flop 100 is clocked; and because the input of flip-flop 100 is tied to its inverted output, the noninverted output of flip-flop 100 toggles between states. This change of state is the phase reversal in the biphase serial data stream. AND gate 98 serves to mask the system clock in order to generate appropriate delay intervals between phase reversals. It has the system clock as one input and the output of NOR gate 94 as its other input. If the output of NOR gate 94 is not "1", the system clock will be masked, and flip-flop 100 will not be clocked. If the system clock is masked for one period, the interval duration will be two clock periods; if the system clock is masked for two periods, the interval duration will be three clock periods; and, if the system clock is not masked at all, the interval duration will be one clock period. Thus, distinct interval durations are produced depending on how many successive periods of the system clock are masked by AND gate 98.

The inputs to NOR gate 94 are the outputs of flip-flop 88 and flip-flop 92 which are clocked with the system clock. When flip-flop 88 and flip-flop 92 both output a "0", the output of NOR gate 94 will be a "1". When the sync signal is "1", or in other words, when transmission register 20 has signaled the end of an x-bit data word transmission to modulator circuit 22, the system clock will be masked twice so that an interval duration of three clock periods is generated. When the sync signal is "1", flip-flops 88 and 92 must go through three cycles before both of their outputs reach the "0" stage. Thus, two system clock periods are masked and the resulting interval duration is three clock periods. When the output of NOR gate 94 outputs a "1", the output of AND gate 96 signals external parallel data source 12 (shown in FIG. 1) to advance new data to transmission register 20.

When the sync signal is "0" and the serial data is "1", flip-flops 88 and 92 must go through two cycles before both of their outputs reach the "0" stage causing the output of NOR gate 94 to go to "1". Thus, one system clock period is masked and the resulting interval duration is two clock periods. When the sync signal is "0" and the serial data is "0", the system clock will not be masked and an interval duration equal to the system clock period, will be generated.

FIG. 7 shows a block diagram of the demodulator 24. Demodulator 24 receives modulated serial data from the communication link 15 between modulator circuit 22 and demodulator circuit 24. This modulated data is input to edge detector 140. The modulated data is also input to delay line 146. The three outputs of delay line 146 are input to delayed data register 148, which is clocked with the output of edge detector 140, the recovered clock. Delayed data register 148 outputs its three inputs to data phase comparator logic 150 on the occurrence of the recovered clock signal. Data phase comparator logic 150 outputs a data and sync signal to recovered data register 152, which is clocked with the recovered clock signal from edge detect 140. Recovered data register 152 outputs its two inputs on the recovered clock signal as recovered data and recovered sync signal.

A more detailed block diagram of edge detector 140 is shown in FIG. 8 and includes small delay device 142 which receives the modulated data signal and X-OR (exclusive OR) gate 144 which receives the modulated data signal and the output of small delay device 142. The output of X-OR gate 144 is the recovered clock. A recovered clock signal similar to the modulation clock signal of modulator circuit 22 is generated when the modulated data switches from the "1" to "0" bit-state or vice versa. This is because right after a switch from one phase to another the modulated data signal will be of opposite state as the signal from small delay 142.

Delay line 146 produces three outputs. One output is a copy of the modulated data delayed by T/2; the second output is a copy of the modulated data delayed by 3T/2; and the third output is a copy of the modulated data delayed by 5T/2, where T is the system clock period. The state of each of these three outputs of delay line 146 are passed through delayed data register 148 on each recovered clock signal from edge detect 140. Data phase comparator logic 150 compares the latched states to determine whether the modulated data was a sync signal, a "1" or a "0". Data phase comparator logic 150 outputs a sync signal if the state of the 5T/2 signal is the same as the state of the 3T/2 and T/2 signals. For a system clock period, T, of 10ns, this output only occurs when the states of data at 5ns, 15ns, and 25ns before the recovered clock signal are all the same. This means that for a sync signal to be output from data phase comparator logic 150, the interval duration must have been 30ns since only this interval duration would have the same state at 5ns, 15ns, and 25ns before the recovered clock signal.

The data output of data phase comparator logic 150 will be "1" if the 3T/2 signal is the same as the T/2 signal, since the interval duration would have the same state at 5ns and 15ns before the recoverd clock signal. Similarly, the data output of data phase comparator logic 150 will be a "0" if the 3T/2 signal is not the same as the T/2 signal.

The data signal and the sync signal output of data phase comparator logic 150 are passed through recovered data register 152 on each recovered clock signal. These recovered data and recovered sync signals are input to recovered data assembly register 26 (shown in FIGS. 3, 4 and 9).

Figure 9:
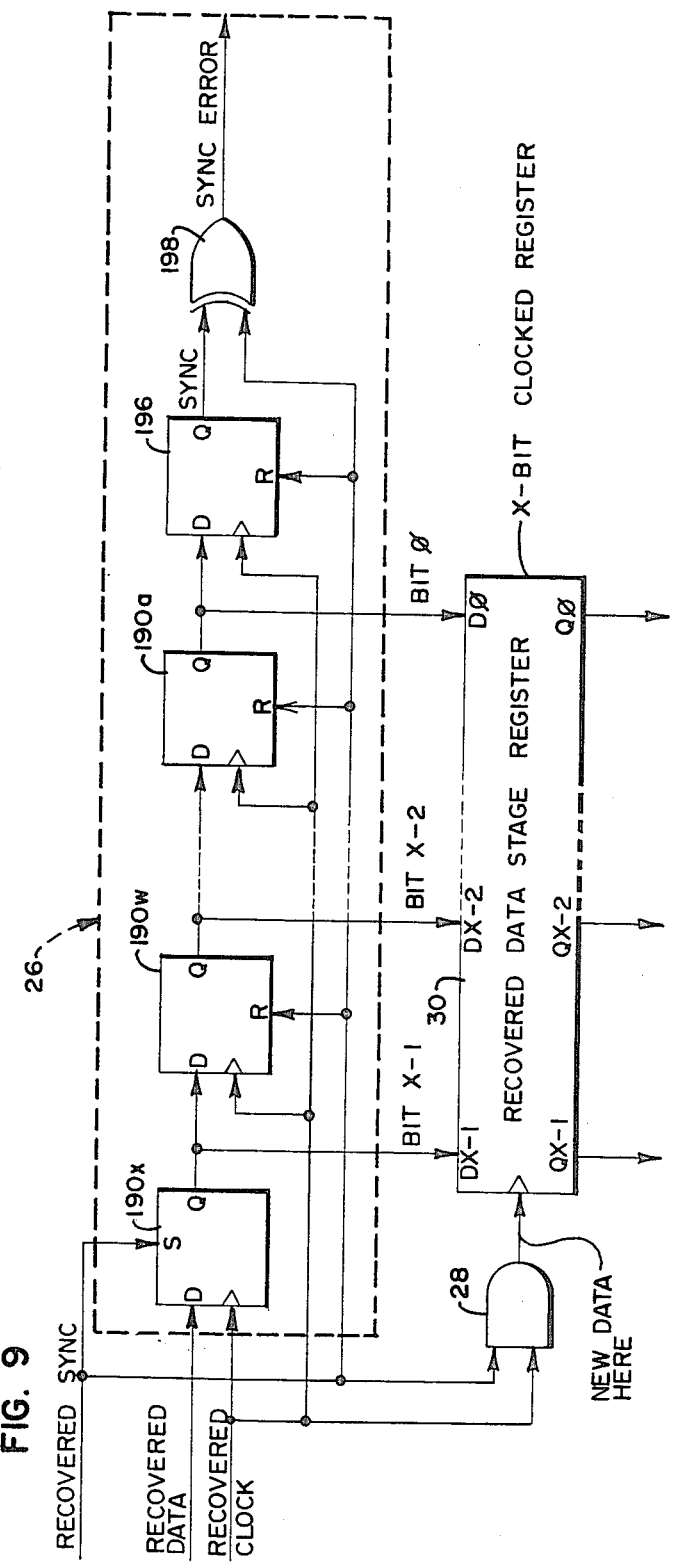
FIG. 9 is a detailed schematic of the recovered data assembly register and a block diagram of the recovered data stage register according to the present invention.

FIG. 9 is a detailed schematic of the recovered data assembly register 26 and a block diagram of recovered data stage register 30. The recovered clock signal from demodulator circuit 24, is used to clock x+1 D flip-flops with synchronous set/reset, 190a-190x and 196, of recovered data assembly register 26. When a recovered sync signal is received by flip-flops 190a-190x and 196, the D input of flip-flop 190x, is set since the recovered sync pulse is applied to the set input of flip-flop 190x. Flip-flops 190a-190w and 196 each have their inputs cleared so that the D input of each flip-flop is "0" since the recovered sync signal is applied to the reset input of these flip-flops.

On the next recovered clock signal, flip-flop 190x will set flip-flop 190w and a recovered data bit will be loaded into flip-flop 190x. This process will continue until the initial "1" in flip-flop 190x is shifted all the way down to set flip-flop 196. At this point, flip-flop 190x will have Bit x−2 of the original x-bit parallel data word, flip-flop 190w will have Bit x −2 of the original x-bit parallel data word, and so on so that flip-flop 190a will have Bit 0 of the original x-bit parallel data word.

Also at this point, since all x bits of x-bit parallel data word have been received by recovered data assembly register 26, the next input received will be the recovered sync signal. Recovered data state register 30 is clocked through AND gate 28 which has as its inputs the recovered sync and the recovered clock signals. Thus, recovered data stage register 30 latches the received data word as an x-bit parallel data word, which is presented to external parallel data destination 18 (shown in FIG. 1).

Recovered data assembly register 26 also includes sync error detection. This sync error detection is implemented with X-OR gate 198. Flip-flop 190x always starts with a "1" when a recovered sync signal is received. As explained above, flip-flop 196 will have this "1" when flip-flip 190a-190x have Bits 0 to x−1, respectively, of the received words. The output of flip-flop 196 is applied to X-OR gate 198 along with the recovered sync signal. When a new recovered sync signal is received flip-flop 196 should be set such that the output of X-OR GATE 198 should be a "0". When a recovered sync signal is not being received by recovered assembly register 26, the inputs of X-OR gate 198 should both be "0" and the output should be "0" and hence no sync error signalled. If for some reason the inputs to X-OR gate 198 are not the same then a sync error signal will issue to show that recovered data assembly register 26 is not in sync. A retransmission may be requested.

Thus, a system for serial biphase data transmission is provided. The system receives a parallel data word, encodes it onto a biphase signal by assigning information or bit states to the time interval between phase reversals, transmits it over a serial data link to a decoder which recovers the bit-states and information, assembles the serial bits into a parallel data word and transfers it out.

This system provides for transmission of each word in a minimized total time because each bit is not separated by a non-code carrying segment and because of the coding scheme employed which assigns the most frequently occurring bit-state to the shortest time interval. Total transmission time is also minimized by assigning time intervals to correspond to plural bit combinations and by having unique time increments so that the time intervals do not become too long for efficient data transmission.

This system provides for a sync signal after transmission of each data word. This signal eliminates the "hunt" mode that interfaces such as the RS-232 interface use to determine their location in a bit stream.

This system also provides for transmission of data with a savings in control logic circuitry because the transmission register and the recovered data assembly register do not require a separate counter circuit to determine when they are exhausted or full, respectively.

Although the invention has been described herein in its preferred form, those skilled in the art will recognize that many changes and modifications may be made thereto without departing from the spirit and scope of the claims appended hereto.

What is claimed is:

1. In a digital data interface a method of encoding an x-bit parallel data word in a serial data transmission, comprising the steps of:
   (a) examining the word to be transmitted and determining which bit-state is in the greatest number;
   (b) generating a biphase signal;
   (c) establishing n distinct time intervals between phase reversals of said biphase signal where n is an integer >2, said time intervals being T, T+i, T+2i and T+(n−1)i where T=minimum time interval and i = the interval increment;
   (d) assigning a first time interval to represent the bit-state determined to be the greatest in number, and assigning a second time interval which is longer than said first time interval to represent the other of said bit-states;
   (e) encoding said biphase signal with said x-bit parallel data word, the individual bits of said word being encoded in said biphase signal so that each interval between a phase reversal represents one of said individual bits, said intervals being determined according to steps (c) and (d).

2. In a digital data interface a method of encoding an x-bit parallel data word in a serial data transmission, comprising the steps of:
   (a) examining the word to be transmitted and determining which bit-state is in the greatest number;
   (b) generating a biphase signal;
   (c) establishing three distinct time intervals between phase reversal of said signal, the first interval being the shortest, the second interval being longer than said first interval and the third interval being longer than said second interval;
   (d) assigning said first interval to represent the bit-state determined to be the greatest in number, assigning said second interval to represent the other of said bit-states and assigning said third interval to represent that transmission of said word is commencing;
   (e) encoding said biphase signal with said x-bit parallel data word and information that a word transmission is commencing, individual bits of said word and said commencement information being encoded in said biphase signal so that each interval between a phase reversal represents one of said individual bits or said commencement information, said intervals being determined according to steps (c) and (d).

3. In a digital data interface a method of encoding an x-bit parallel data word in a serial data transmission, comprising the steps of:
   (a) generating a bi-phase signal;
   (b) establishing n distinct time intervals between phase reversals of said biphase signal where n is an integer ≧2, the increment between sucessive time intervals being $I_j$ for j=0, 1, ... n−1 where $I_j$ is unique for each progressively larger time interval;
   (c) assigning each of said time intervals to represent a unique bit-state or combination of bit-states;
   (d) encoding said biphase signal with said x-bit parallel data word, the individual bits of said word being encoded in said biphase signal so that each interval between a phase reversal represents one of said bit-states or a combination of bit-states, said intervals being determined according to steps (b) and (c).

4. A data encoder comprising:
   biphase generating means for generating a biphase signal;
   a transmission register for receiving an x-bit parallel data word in a parallel load and for shifting said parallel data out one bit at a time as a serial data stream;
   modulation means for controlling the time intervals between phase reversals in said biphase signal;
   said modulation means including means responsive to an individual bit in said serial data stream for encoding said biphase signal with a corresponding time interval between phase reversals which corresdonds to the state of said individual bit, a first time interval corresponding to a first bit-state and a second longer time interval corresponding to a second, other bit-state whereby one and zero bits may be encoded in said signal; and
   said modulation means further including:
   (a) means for determining which bit-state in said x-bit word is greatest in number; and
   (b) means for assigning said first time interval to the bit-state determined to be the greatest in number and said second time interval to the other bit-state, said assignment determined on a word-by-word basis so that the total time required to transmit a word is minimized for each word.

5. The encoder according to claim 4 wherein said modulation means further includes:
   means responsive to a bit combination in said serial data stream for encoding said biphase signal with a corresponding time interval between phase reversals which corresponds to a certain combination of one and zero bits.

6. The encoder according to claim 4 wherein said transmission register comprises: x+1 two-to-one multiplexor D-type flip-flops, where x is an integer, each of said flip-flops including:
   (a) first and second data inputs D0 and D1, respectively
   (b) a data select input for selecting between said D0 and D1 inputs;
   (c) a clock input for clocking said flip-flop; and
   (d) a Q-output;
   NOR-gate means;
   means for connecting said flip-flops in series with the Q-output of one connected to the D0 input of the next in the series, the Q-output of the last in said series constituting a serial data output for producing said serial data stream, the D0 input of the first in said series connected permanently to a zero bit-state and the D1 input of said first flip-flop permanently connected to the one bit-state;
   an x-bit parallel data bus;
   means for connecting each of the individual lines of said bus to one of the x+1 D1-inputs of said flip-flops except for said first flip-flop;

means for connecting NOR gate means to said D-type flip-flops so that the inputs of said NOR-gate means are taken from the Q-outputs of all but said last one of said flip-flops, the output of said NOR-gate means connected to the select inputs of said flip-flops, said NOR-gate means for causing the parallel data off said data bus to be periodically loaded in said flip-flop series, and for causing said one bit-state to be loaded in said first flip-flop at the same time, and for othewise causing said other DO-inputs of said flip-flops flops to be selected as the data source;

said clock-inputs of said flip-flops all connected to a common modulation clock signal;

whereby when said zero bit-state has propogated all the way down said series the output of said NOR-gate means changes state to cause said x-bit parallel data to be loaded whereupon said data is serial shifted out said serial data output until said zero-state has again propogated all the way down.

7. An encoder according to claim 4 wherein said modulation means includes:

(a) transmission clock means for generating a periodic clock signal, the period of said signal equal to said first time interval;

(b) output flip-flop means for generating a biphase output signal, the phase of said signal reversing each time a clocking signal is applied to said output flip-flop means, (c) gating means for selectively gating said periodic clock signal to said output flip-flop;

said gating means responsive to a first logic level of said serial data stream for allowing consecutive periodic clock signals to pass;

said gating means further responsive to the other logic level of said serial data stream for masking one of said periodic clock signals so that said output flip-flop is clocked only once in two of said clock periods whereby data may be encoded as time intervals between phase reversals in a biphase signal.

8. A data decoder for decoding data encoded in a serial biphase data stream, comprising:

edge detect means for detecting phase reversal of said biphase data stream and for producing a recovered clock signal in response thereto;

delay line means for receiving said biphase data stream and producing n copies, where n=the number of different time intervals between the phase reversals of said biphase data stream, of said stream delayed by $T/2, 3T/2, 5T/2 \ldots$ and $(2n-1)T/2$ for $n=1, 2, 3 \ldots n$, respectively, where T is the time period corresponding to a first data cell;

computer logic means receiving said recovered clock signal and said delayed copies for decoding said biphase streams for producing recovered data signals and a recovered sync signal;

recovered data assembly register means including $x+1$ D-latch with synchronous set/reset flip-flops, said flip-flops connected in series with the Q output of one connected to the D input of the next, the D and S inputs of the first in said series connected to receive said recovered data signal and said recovered sync signal, respectively, the clock inputs of all flip-flops in said series connected to said recovered clock signal, the reset inputs of all but said first in said series connected to said recovered sync signal whereby said first flip-flop is set to a one condition and the remaining flip-flops are reset upon the occurrence of a sync signal; said recovered data as seen by register means further including a recovered data stage register connected to receive the Q-outputs of the first x flip-flops in said series as a parallel data word, said data stage register clocked by an AND-gate receiving said recovered clock signal and said recovered sync signal whereby data is captured whenever a recovered sync signal is present.

* * * * *